18, 1966

PREPARATION OF ALKYL AZIRIDINYL-FORMATES

George E. Ham and Carl H. Klentsch, Lake Jackson, Tex., assignors to The Dow Chemical Company, Midland, Mich., a corporation of Delaware
No Drawing. Filed Oct. 4, 1965, Ser. No. 492,888
6 Claims. (Cl. 260—239)

This invention relates to methods for making esters, especially alkyl esters, of 1-aziridinylformic acid. The method is in accord with the equation

$$\triangleright N-COOR + R_1COOR_2 \longrightarrow \triangleright N-COOR_2 + R_1COOR$$

wherein R is a lower alkyl radical, preferably methyl or ethyl, $R_1$ is H or a lower alkyl radical, preferably methyl, and $R_2$ is a primary alkyl, alkenyl or aralkyl radical of 2–8 carbon atoms.

For practical reasons it is essential that one of the two products shown in the above equation have a boiling point below those of the two reactants so that said product can be removed by distillation as it is formed in the reaction mixture; otherwise the reaction approaches an equilibrium short of completion and substantially stops. For this reason it is preferable that R and $R_1$ be radicals of low molecular weight, e.g., that they contain not more than two carbon atoms. For the same reason it is preferable that $R_2$ have a higher molecular weight than R. This not only facilitates removal of the by-product ester $R_1COOR$ but, in the case of incomplete reaction, facilitates the separation of the two aziridinylformate esters by distillation.

Since the above ester interchange reaction is inordinately slow in the absence of a catalyst, it is essential that an esterification catalyst be used. While both acids and bases are known to be esterification catalyst, both are also known to catalyze the polymerization of aziridinylformates (see, for instance, U.S. Patent 3,162,618). It is therefore surprising that although acid catalysts cannot be used in this process because of excessive polymerization, alkali catalysts are not only permissible but are essential. While the known alkaline esterification catalysts are in general effective, the preferred catalysts are the strong alkalies, such as alkali metal hydroxides or alkoxides.

In a preferred mode of practicing the invention, the reactants and catalyst are mixed under anhydrous conditions, the reaction mixture is heated to a suitable reaction temperature, such as 25–130° C. and, preferably, the pressure is adjusted so that the mixture refluxes. As the reaction proceeds, the most volatile product, usually the by-product ester, is removed by distillation, either continuously or intermittently, thus driving the reaction to substantial completion. At the end of the reaction period the desired product is separated by any suitable means, usually by fractional distillation. This is preferably done at low temperature (e.g., below 100° C.) and, usually, under reduced pressure.

The practice of the invention is illustrated by the following examples.

Example 1

Into a reactor was placed 116 g. of n-butyl acetate, 115 g. of ethyl aziridinylformate and 0.4 g. of sodium methoxide. The mixture was maintained at 25–35° C. while the pressure was maintained at the point at which the reaction mixture refluxed (15–20 mm.). As the reaction proceeded, the ethyl acetate thus produced was distilled out as formed. After 10 hours of reaction the reaction mixture was distilled at 20–46° C. (1.2 mm. or less) to produce 131.8 g. of distillate which by vapor phase chromatography was shown to consist of 38.4 g. of ethyl aziridinylformate and 93.3 g. of n-butyl aziridinylformate. The two esters are easily separated by fractional distillation. Thus, the conversion of the ethyl ester was 66.8% and the yield of butyl ester was 97.5%.

Example 2

A mixture of 40.4 g. of n-butyl acetate, 48.9 g. of ethyl aziridinylformate and 2.3 g. of sodium methoxide was refluxed 1 hour at 128–130° C., after which all material distilling below 126° C. (1 atm.) was removed. VPC analysis of the residue showed 25.8 g. of n-butyl aziridinylformate. No ethyl aziridinylformate was recovered. Yield of butyl ester after fractional distillation (45–55° at 0.4 mm.) was 42.5%.

Results generally similar to those above are obtained with other reactants within the defined class. Thus, good results are obtained with reactants wherein R is methyl or propyl, when $R_1$ is H or ethyl and when $R_2$ is methyl, n-propyl, isobutyl, 2-ethylbutyl, 2-ethylhexyl, n-octyl, allyl, methallyl, benzyl or phenethyl.

We claim:

1. The process for making a first ester of the formula

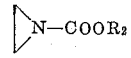
$$\triangleright N-COOR_2$$

comprising heating at reaction temperature a mixture of
   (1) a second ester of the formula

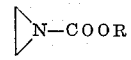
$$\triangleright N-COOR$$

(2) with a third ester of the formula $$R_1COOR_2$$

and
   (3) an alkaline esterification catalyst wherein the above formulas R is a lower alkyl radical, $R_1$ is H or a lower alkyl radical and $R_2$ is a primary alkyl, alkenyl or aralkyl radical of 2–8 carbon atoms.

2. The process of claim 1 wherein the molecular weight of $R_2$ exceeds that of R.

3. The process of claim 2 wherein R is ethyl.

4. The process of claim 3 wherein $R_1$ is methyl.

5. The process of claim 1 wherein the catalyst is an alkali metal alkoxide.

6. The process of claim 1 wherein the reaction temperature is 25–130° C.

No references cited.

ALEX MAZEL, *Primary Examiner.*

ALTON D. ROLLINS, *Assistant Examiner.*